United States Patent [19]

Sibley, Jr.

[11] Patent Number: 4,677,552
[45] Date of Patent: Jun. 30, 1987

[54] INTERNATIONAL COMMODITY TRADE EXCHANGE

[76] Inventor: H. C. Sibley, Jr., 7418-D Fair Oaks, Dallas, Tex. 75231

[21] Appl. No.: 658,360

[22] Filed: Oct. 5, 1984

[51] Int. Cl.$^4$ .................. G06F 15/20; G06F 15/24; G06F 15/38
[52] U.S. Cl. .................. 364/408; 364/401; 364/419; 364/900
[58] Field of Search ............ 364/400, 401, 408, 419, 364/200 MS File, 900 MS File; 235/375, 379; 343/352–354

[56] References Cited

U.S. PATENT DOCUMENTS

| | | | |
|---|---|---|---|
| 3,349,398 | 10/1967 | Werth | 343/353 X |
| 3,573,747 | 4/1971 | Adams et al. | 340/172.5 |
| 4,114,027 | 9/1978 | Slater et al. | 364/408 X |
| 4,334,270 | 6/1982 | Towers | 364/408 X |
| 4,346,442 | 8/1982 | Musmanno | 364/408 |
| 4,390,968 | 6/1983 | Hennessy et al. | 364/900 |
| 4,412,287 | 10/1983 | Braddock, III | 364/408 |
| 4,566,066 | 1/1986 | Towers | 364/408 |

Primary Examiner—Gary V. Harkcom
Attorney, Agent, or Firm—Sigalos & Levine

[57] ABSTRACT

An International Commodity Trade Exchange having a central exchange post for providing international commodity information and a plurality of local exchanges in at least two countries around the world. A plurality of user computer terminals are coupled to each of the local exchanges and can request and receive data representing marketing information directly from the central exchange host and transmit data representing bids and offers to any other user terminal around the world through the local exchanges and the host exchange. The communication takes place through a satellite communication network thereby allowing traders associated with any particular local exchange to trade in a selected market with any other trader associated with any other local exchange at any member site located in any country around the world.

23 Claims, 10 Drawing Figures

FIG. 5

```
TRADER ACCESS CONTROL SCREEN
                                    JULY 27, 1984

PLEASE ENTER YOUR NAME AND ACCESS CODE

FIRST NAME:_____  LAST NAME:_____
       ACCESS CODE:_____

(IF YOU HAVE ANY DIFFICULTIES CALL 1-800-555-1212)
```

FIG. 6

COMMODITY SELECTION SCREEN
COMMODITY TRACKING SELECTION          JULY 27, 1984

| | | |
|---|---|---|
| ○ CORN | ○ PORK 50 | ○ SILVER |
| ○ OATS | ○ COCOA | ○ GASOLINE |
| ○ SOYBEAN | ○ COFFEE | ○ HEATING OIL |
| ○ WHEAT | ○ COTTON | ○ CRUDE OIL |
| ○ BARLEY | ○ ORANGE JUICE | ○ LUMBER |
| ○ FLAXSEED | ○ SUGAR | ○ PLYWOOD |
| ○ RAPESEED | ○ COPPER | ○ POTATOES |
| ○ RYE | ○ GOLD | ○ PROPANE |
| ○ CATTLE | ○ PLATINUM | ○ RICE |
| ○ HOGS | ○ PALLADIUM | (CONTINUED) |

○ PREVIOUS —51
○ NEXT —51
PAGE 1

FIG. 7

COMMODITY EXCHANGE INFORMATION SELECTION   JULY 27, 1984

| | | |
|---|---|---|
| ○ NYMEX | ○ TORONTO | ○ HONG KONG |
| ○ NYFE | ○ PHILA-DELPHIA | ○ SIMEX |
| ○ CHICAGO MERCANTILE | ○ COMEX | ○ SINGAPORE |
| ○ CHICAGO BOARD OF TRADE | ○ BRUSSELS | ○ SWISS |
| ○ CHICAGO BOARD OF TRADE | ○ LCM | ○ GERMAN |
| ○ PREVIOUS | ○ NEXT | (CONTINUED) PAGE 1/3 |

51   51

INTERNATIONAL COMMODITY TRADE EXCHANGE

BACKGROUND OF THE INVENTION

The present invention relates to a trade exchange system and in particular to a world trade exchange having a central exchange host for providing international commodity information and a plurality of local exchanges in various sites around the world wherein a plurality of user computer terminals coupled to each of said local exchanges can request and receive data representing marketing information directly from the central exchange host and transmit data representing bids and offers to its local exchange.

There are many different types of commodity exchanges in existence, such as the New York Stock Exchange, the Chicago Board of Trade, and the like. Normally, these exchanges function by having brokers who represent clients in buying or selling commodities through the particular exchange, as well as obtaining market information from the exchanges for clients regarding market activity. The markets include, but are not limited to, the futures market, cash market, oil market, stock market, and securities market.

Recently there has been an increase in automated trading exchanges having a central procéssor associated with one or more remote terminals through which trades can be made by members of the exchange or that provide market information to members of the exchange upon request. Such a system is described in U.S. Pat. No. 3,573,747 which, for instance, allows institutional investors to communicate anonymously with each other for the purpose of arranging trades of listed and over-the-counter securities.

While the automated systems provide many advantages for traders such as preventing or at least inhibiting market manipulation, increasing the speeds at which trades are made, time dating the purchase or sale of a particular commodity, and the like, there is still no practical provision in the art for exchanges located at various sites around the world being able to communicate with each other and allow users in one exchange to trade through electronics directly with users who are members of other exchanges around the world.

The present invention overcomes the disadvantages and problems of the prior art by providing a central exchange host arrangement and system that is in communication, through means such as a satellite system, with local exchanges located at various sites around the world. A remote terminal user member of any one exchange can trade with a remote terminal user member of its own exchange or with a user member of any other exchange around the world through its local exchange and the central exchange host which monitors all of the trades in each of the local exchanges and provides market information to a remote terminal user member that belongs to any of the local exchanges at the various sites around the world. Thus, the user member of any one local exchange can communicate directly with the central exchange host to obtain market information relative to any member exchange. He can also make bids and offers to any other local exchange user member through his own local exchange which communicates through the satellite system with the central exchange host and with the other selected exchange. Thus, if a user member of the World Energy Exchange in Dallas would like to obtain market information concerning trading of a particular commodity on a Paris commodity exchange, he may communicate directly with the central exchange host and obtain that informattion. If the same user member wishes to trade with another user member of the Paris Commodity Exchange, he would enter a bid or an offer through his remote terminal to his local exchange which would then communicate that information to the central exchange host and then to the Paris Commodity Exchange through the satellite system where the bid or offer would be displayed on the user member remote terminal. Thus, a user member of the Dallas World Energy Exchange could effect a commodity trade with a user member of the Paris Commodity Exchange or any other member exchange around the world.

The commodity information and trading transaction paths from the individual local commodity exchanges takes places as follows. A central gathering point (central exchange host) of commodity information from the individual local commodity exchanges is established. The commodity information will come in via land or satellite communication connections. The information is then transmitted via satellite(s) world wide to local exchanges. The traders have the necessary equipment to receive the broadcasted commodity information at remote user terminals and sort out and display the preselected individual exchanges around the world with which they wish to trade as well as displaying the commodities in which they are interested. From the correlations and observation of the commodity information the trader decides upon a position (i.e., bid or offer). The desired position is entered and transmitted via satellite to the central gathering point and routed to the individual local commodity exchange(s). Upon confirmation of receipt by all involved local commodity exchanges participating in the submitted position and the acceptance of the position by another trader, the central exchange host transmits a position confirmation to the individual trader at the remote user terminals completing the establishment of a position transaction.

Information flow is then in two basic forms. First, the gathering and subsequent worldwide broadcast of participating local commodity exchanges marketing information. This commodity marketing information is received in bulk by the traders' rremote user terminals where it is selectively displayed. The second information flow is independent of the first but uses the same communications paths. The second information flow is a transaction consisting of the entry of a proposed commodity trading transaction and the notification of its acceptance by a trader member of the designated local exchange. The established position and its subsequent liquidation or completion is also routed through the central exchange host.

A touch screen data entry system is associated with the remote user terminals screen display for displaying input information and data representing the bids and offers. By physically touching symbols representing a bid or an offer, the commodity selected, and the local exchange selected, the pertinent data is input from the user terminal into the system for transmission through the user's local exchange, the central exchange host, and the selected local exchange to the remote user terminals associated with the selected exchange.

SUMMARY OF THE INVENTION

The present invention relates to a computerized world trade exchange comprising a plurality of local computerized trade exchanges located at various sites around the world, each local exchange enabling computerized trades in markets such as the futures market, cash market, oil market, stock market, and the securities market; means in each local exchange for identifying the local exchange by a first code; a plurality of user computer terminals coupled to each of said local exchanges, each for transmitting and receiving trading data representing bids and offers to, and from, its respective local exchange; means in each of said user terminals for generating a second code for identifying said user terminal; a central exchange host having a computer therein and a communication system coupling said local exchanges to said central exchange host whereupon said central exchange host rreceives from, and transmits to, each local exchange said trading data representing user bids and offers and identifies each of said local exchanges by recognizing said first code and identifies said user terminals by recognizing said second code thereby enabling each of said user terminals in any one local exchange to communicate said trading data through its respective local exchange and said central exchange host to any other user terminal and any other local exchange to effect a trade. The central exchange host computer further includes means for storing said trading data received from said local exchanges and identified by said first code and for storing trading said data representing all said user bids and offers transmitted by said user terminals and identified by said second code whereby all such trading data representing said user bids and offers may be available from said central exchange host to any other of said user terminals through its respective local exchange to effect a trade.

The invention also relates to a method of computerizing a world trade exchange comprising the steps of establishing a plurality of local computerized trade exchanges, each of said local exchanges enabling computerized trades in markets such as the futures market, cash market, oil market, stock market, and the securities market, locating each of said local exchanges at a predetermined one of a like plurality of sites around the world, establishing the identity of each local exchange by a first code, coupling a plurality of user terminals to each local exchange for transmitting and receiving trading data representing user bids and offers to, and from, their respective local exchange, establishing the identity of each of said user terminals by a second code, establishing a central exchange host having a computer therein, and coupling each of said local exchanges to said central exchange host by a communication system whereby said central exchange host receives from, and transmits to, each local exchange said trading data representing user bids and offers and identifies each of said local exchanges by recognizing said first code and identifies said user terminals by recognizing said second code thereby enabling each of said user terminals in any local exchange to communicate said trading data through its respective local exchange and said central exchange host to any other user terminal in any other local exchange to effect a trade. The method also includes storing in said central exchange host computer said trading data received from said local exchanges and identified by said first code and for storing said data representing all said user bids and offers transmitted by said user terminals and identified by said second code whereby all such trading data representing said user bids and offers may be available from said central exchange host to any other of said user terminals through its respective local exchange to effect a trade.

BRIEF DESCRIPTION OF THE DRAWINGS

These and other more detailed objects and advantages of the present invention will be seen in relation to the accompanying drawings in which:

FIG. 5 is a representation of the trader access control screen;

FIG. 6 is a diagrammatic representation of the commodity selection screen which includes touch screen data entry;

FIG. 7 is a diagrammatic representation of the commodity exchange information selection screen which includes touch screen data entry;

DETAILED DESCRIPTIONS OF THE DRAWINGS

Figure 1:
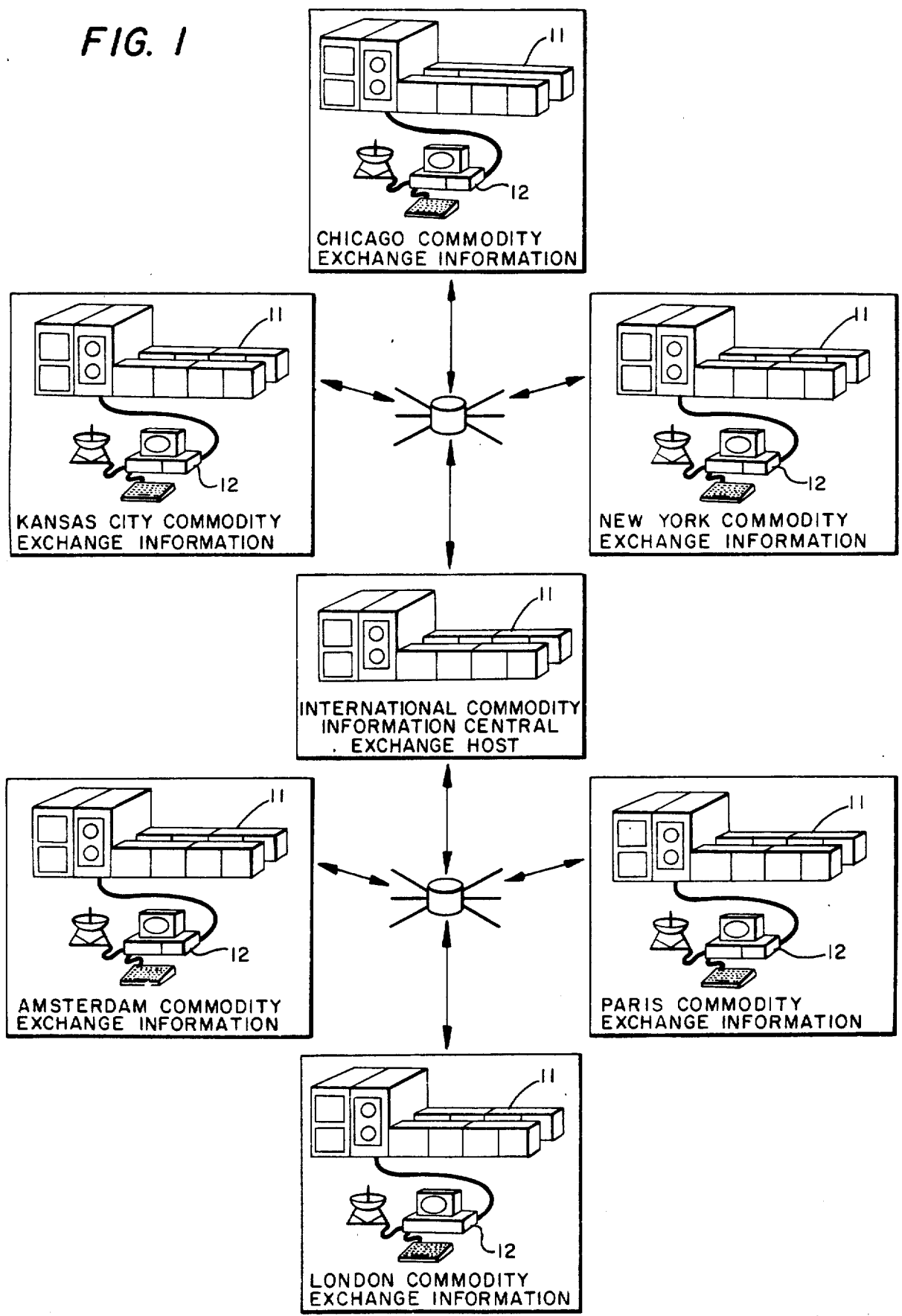
FIG. 1 is a diagrammatic representation of the novel system as a whole illustrating the central exchange host and the worldwide local exchanges with user terminals communicating with the local exchanges and the local exchanges communicating by satellite with the central exchange host.

As illustrated in FIG. 1, a plurality of local computerized trade exchanges 10 are located in various sites around the world. Local exchanges 10 may include equipment 11 such as storage devices, encrypting/decrypting apparatus, language translators and the like as will be described hereinafter. For example, the local exchanges illustrated in FIG. 1 may include the Chicago Commodity Exchange, the New York Commodity Exchange, the Paris Commodity Exchange, the London Commodity Exchange, the Amsterdam Commodity Exchange, and the Kansas City Commodity Exchange. Obviously, more exchanges located at other sites around the world could also be added to this system and those illustrated in FIG. 1 are for purposes of illustration and discussion only and are not intended to be limiting. A plurality of user terminals 12 are associated with each of the local exchanges 10. Only one of the user terminals 12 is shown in FIG. 1 to be associated with each exchange but this is for ease of illustration and clarity of explanation only. There could be any number of local user terminals 12 communicating with each of the local exchanges 10 shown in FIG. 1.

In addition, each of the local computerized trade exchanges 10 can communicate with a central exchange host 14 through a communication system such as satellite 16 to obtain market information and transmit and receive trading data such as bids and offers to and from any other local exchange 10. The equipment 11, previously mentioned is also associated with central exchange host 14. Thus, if the member at user terminal 12 coupled to the Kansas City Commodity Exchange 10 desires to trade a particular commodity with a member at user terminal 12 coupled to the particular commodity and the name of the London Commodity Exchange 10, he may select and enter the name of the London Commodity Exchange at his own terminal and send it through the local Kansas City Commodity Exchange 10 and that information is transmitted through satellite 16 to the central host exchange 14 which relays the information again through satellite communication system 16 to the London Commodity Exchange 10. Satellite system 16 may be accessed at any time. The information request or user bid or offer trading data will then be relayed to each of the local user terminals 12 and if one of the local users or members associated with the London Exchange 10 desires to trade with the member associated with the Kansas City Exchange 10, he may do so. Thus, the system allows any one local user terminal 12 associated with any one particular local commodity exchange 10 to communicate with and trade, if desired, with any other user terminal 12 associated with any other of the local commodity exchanges 10 through the satellite system 16 and central exchange host 14.

Figure 2:
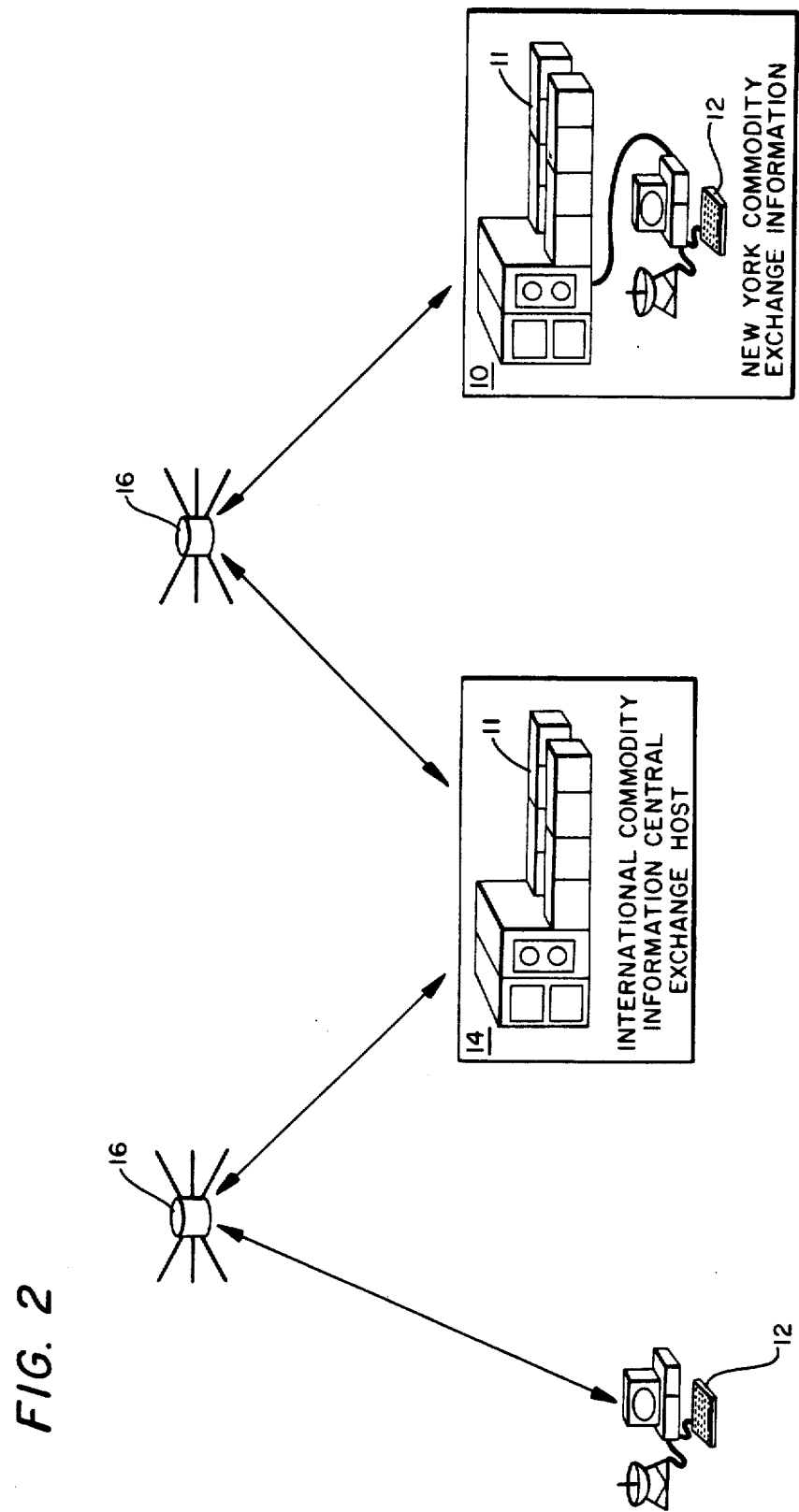
FIG. 2 is a diagrammatic representation of the information flow between the central exchange host directly to and from the local user terminals or to and from the local exchanges.

FIG. 2 is a diagrammatic representation of a part of the novel system illustrating both market information flow and data flow for trading purposes. As can be seen in FIG. 2, any one of the remote terminals 12 may obtain marketing information directly from the central exchange host 14 through satellite 16 and thus avoid the requirement of going through the local exchange 10. However, should any of the remote terminal users 12 desire to receive or transmit trading data, such as bids and offers, then it must communicate with its local exchange 10 which then not only records, but also relays, the trading data through satellite 16 and back to the central exchange host 14 who passes that data on to the other local exchange 10 with which communication is desired. Thus, data and market information flow may take two different paths with the information flow going directly from the user terminal 12 through the satellite 16 to the international central exchange host 14, while the data transmission regarding trades takes place from the remote user terminal 12 through its associated local exchange 10 through satellite 16 to the central exchange host 14 and then back through the satellite system 16 to the other local exchange 10 with which the trade is desired. Market information may also be obtained, if desired, through the local exchange 10.

As stated earlier, all of the local exchanges 10 are computerized and the trading rules of the participating exchanges are such that the traders operating user terminals 12 on any participating local exchange 10 can trade with any other trader terminal 12 associated with any other local exchange 10. The U.S. trading rules enforced by the Securities and Exchange Commission are the rules by which the network of the present invention will operate. Other rules could be followed if allowed and adopted. The trades are stored in the local exchange 10 and then communicated to the world trade exchange or central exchange host 14. The local exchange 10 keeps the permanent records for its users 12 while the world trade exchange 14 keeps the permanent records for the local exchanges 10. Thus, the central exchange host computer 44 (in FIG. 4) would store the trading data received from the local exchange 10 which are identified by a first code and the data representing user bids and offers transmitted by user terminals 12 and identified by a second code whereby all of the trading data representing user bids and offers from any one user terminal 12 is available from central exchange host 14 to any user terminal 12 through its respective local exchange 10 to effect a trade. The world trade exchange 14 records would only be for the local exchanges 10 that use the system as members while the local exchanges 10 will have locally associated traders or users 12 as members that do not access the world trade exchange 14 except to obtain market information. Physical security of the entire system can be handled in a number of known ways. The method chosen is determined by effectiveness and cost. One example is the magnetic stripe card (credit card like) that has to be present in a power supply accessory for there to be power to the trading terminal 12. This, in conjuction with a user password, is more than adequate. Also, encryption/decryption circuits will be used for privacy as discussed hereafter.

Figure 3:
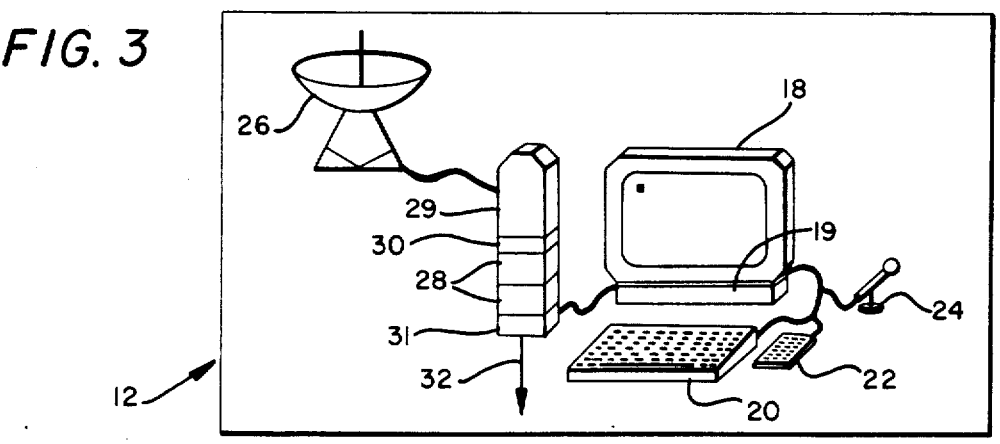
FIG. 3 is a diagrammatic representation of the apparatus forming the local user terminal.

FIG. 3 is a diagrammatic representation of the necessary equipment for each of the remote user terminals 12 with which the user will receive the transmitted commodity information and sort out his preselected individual exchanges of interest and commodities of interest for display and trading. The following is a summary of the major components that will be part of the traders computer terminal 12:

Satellite dish 26: A small commonly-known dish to receive commodity information and transmit and receive trading transactions to and from local exchanges worldwide.

Microprocessors(s) 19: The individual computer is a prior art device which consists of multiple processors that perform specialized functions concurrently. The functions necessary are communications (satellite transmission/reception), information security (data encryption/decryption), main processing unit (program execution, memory management), and display formatting (taking and formatting data into screens from memory), all well known in the art. It also includes a code which identifies that particular user terminal.

Monitor 18: High resolution bit map display available in the art. The resolution is of sufficient quality to support the trading graphics character set and overlapping windows. Color is also a necessity in displays that are used for long hours since color will keep the trader alert and the color gives another dimension of information that can be conveyed to the trader.

Disk storage 28: The disks are small Winchesters of optional sizes ranging from 10 megabytes to 140 megabytes and are well known in the art.

Tape drive 30: The streaming tape drive is also well known in the art and is configured to be able to back up the disks 28. Time to back up the disk 28 requires no more than 15 minutes and no more than 3 tapes.

Floppy disk 29: The floppy disk is well known in the art and is used to load user programs, to do decision projections, and perform market trend predictions.

Power conditioner 31: Because the terminal will be used worldwide, the power module is able to accept varying current levels and continue to operate through power fluctuations and even short power outages. Such power conditioners are available in the prior art.

Data entry media 20, 22, 24: The trader considers the terminal 12 to be a natural extension of his normal working environment. To accomplish this, the interface to the trader is versatile. Data entry is done through a normal keyboard 20, a numeric keypad 22, and voice entry 24. Screen transitions are accomplished by voice or touch screen entry. Errors and event notification are by symbols and voice output. All text and voice output are translated to the traders' native language.

From the correlation and observation of the commodity information presented on monitor screen 18, the trader will decide upon a trading position such as buy or sell of a particular commodity on a particular local exchange that is selected and at a particular price. This desired position will be entered as trading data either through keyboard 20, voice data entry microphone 24, or a touch screen associated with monitor 18 as will be explained hereinafter. Of course, the numeric key pad 22 can be used to enter numerical data also. This trading data will be transmitted through antenna 26 to satellite 16 and central exchange host 14 (in FIG. 1 and FIG. 2) where it will be routed through the selected local exchange 10 to the individual user terminals 12 where the trading data is displayed. Upon acceptance of the trade data or trade position by any one of the traders at user terminals 12 coupled to the involved local commodity exchange 10 selected to participate in the proposed trade, the central exchange host 14 will transmit a transaction confirmation to all of the individual trader terminal 12 affected by the two local exchanges 10 involved, thus completing the establishment of a position transaction. Trade data from the different exchanges 10 (constantly being received via the satellite dish 26 along with the information of interest that the trader or user has selected to be displayed) is updated on the monitor 18 or stored in the memory units 28 and 30 allocated to the possible displays the trader wants to appear upon request. The capabilities of the components vary depending on the requirements of the individual trader. The variables that determine the individual trader's hardware requirements are the number of commodities and exchanges the trader wants to follow in real-time. The components affected are the amount of memory required, the amount of storage 28 (winchestor disks), and the speed and size of the streaming tape drive 30. Since the traders or users associated with the worldwide local exchanges 10 may be located in many countries with different languages being spoken, each configuration also contains the necessary character translation ability (42 in FIG. 4) to display text in the trader's native language even through it may have been generated in a different language. The symbols displayed on the screens will make the terminals 12 user friendly and will consist of internationally recognized symbols as will be discussed hereinafter. Screen navigation and item selection by the operator or user is accomplished by a combination of touch screen 18, keypad entry 20 and 22 and voice entry 24. Prompting of the trader will be accomplished by voice (34 in FIG. 4) and text display (48 in FIG. 4). Textual information will be received and printed on a high density matrix printer 49 or a laser printer, depending on the required speed of printing and the daily volume.

As indicated earlier, information flow is in two basic forms. The first is the gathering and subsequent worldwide rebroadcast of market information from participating local commodity exchanges 10. This commodity market information consists of data representing the trading of each commodity including price, volume, and the like and is then received in bulk by the user's terminal 12 where it is selectively displayed according to the type of information requested. Satellite transmissions are usually sent in large blocks of characters. Such large blocks of data are referred to as "in bulk". The block of characters contains information that the trader may or may not be interested in, so the software will extract the user selected desired information, format it, and display it upon request by user terminal 12.

The second form of information flow is independent of the first, but may use the same communication path. This information flow concerns the entry of commodity trading transaction data such as the submission of a bid and the acceptance of an offer and notification to all users of the submission of the bid and the acceptance of the offer and notification to all users of subsequent trades on the participating commodity exchanges 10 through the central exchange 14 and through the communication paths involving the satellites and/or telephone transmission.

Thus, referring again to FIG. 3, requests for information which are entered through either keyboard 20, numeric key pad 22, voice entry microphone 24, or the touch screen of monitor 18 are stored in appropriate discs or tape storage units 28 and 30. The output from these storage units can be coupled either through satellite dish 26 or through telephone lines 32 to the desired location. Thus, if market information is being requested from other local exchanges, that information will be directly requested from the central host exchange 14 through satellite dish 26. If the communication input relates to trading, such as bids or offers, it is coupled through phone lines 32 to the local exchanges 10 where that information then is relayed to other local exchanges 10 through the satellite system 16 and the central exchange host 14.

Figure 4:
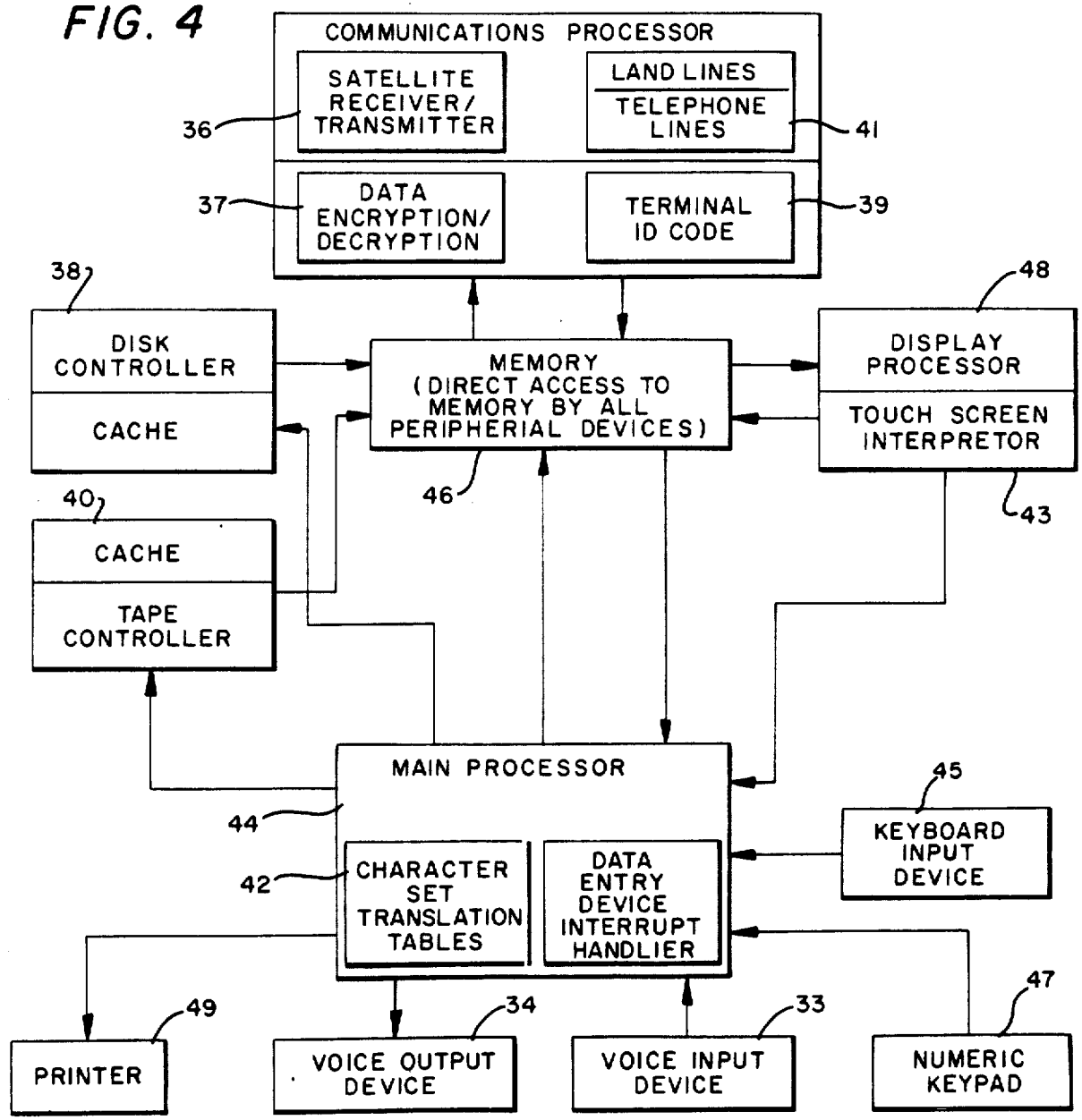
FIG. 4 is a more detailed diagrammatic representation of the apparatus forming the user terminal.

FIG. 4 is a diagrammatic representation of the details of user terminal 12. The apparatus disclosed in FIG. 4 is similar to that used in the local exchanges 10 and the central exchange host 14. All or part of the apparatus disclosed in FIG. 4 may be used in local exchange 10, user terminal 12, or central exchange host 14 The exchanges 10 and 14 and user terminal 12 will include a satellite receiver/transmitter 36 which will include encryption/decryption circuits 37 for security purposes and an identification code number circuit 39. Thus, there is a first identification code for each local exchange 10 and a second identification code for each remote terminal 12. All data which is transmitted to and from the satellite 16 will pass through this receiver/transmitter 36 and all of the data being received or transmitted will be encoded or scrambled so that it has to be either decrypted (descrambled) or encrypted, depending upon whether it is being sent or received. Telephone lines 41 can also be used to communicate to and from the multiple remote user terminals 12 to the local exchange 10 or could be used between local exchanges 10 and host exchange 14. The satellite system is preferred however. Main processor 44 will, of course, have the ability to have data input to it through means which can be any type of data input such as voice input device 33, touch screen 43, keyboard 45 and/or numeric keyboard 47. The main processor 44 accesses main memory 46 as well as cache memories 38 and 40 which may be discs or tape. In addition, any data contained in memories 38, 40, and 46 may be displayed by monitor 48. The local exchanges 10, as well as the central exchange 14, will operate preferably as described in copending patent application Ser. No. 548,,319, filed Dec. 16,, 1983, but could operate as described in U.S. Pat.

No. 3,573,747. Thus, the international commodity trader, through the remote user terminal 12, will be able to trade with any other international commodity trader member associated with any other local exchange 10.

Market information from the different local exchanges 10 (FIG. 1) is constantly being received by the central exchange host 14 via satellite dish 16 and that market information that the trader has selected to be displayed is updated constantly on the monitor 18 of remote user terminal 12 or in the memory 38, 40, or 46 allocated to the possible commodities the trader wants to appear upon request.

The symbols displayed on the screens may consist of well-known internationally recognized items. Such symbols form an alternate character set definition of international trading symbols that are graphics characters. Most character sets in the prior art consist of 127 characters which include the alphabet (upper and lower case) and numbers 0–9. The rest of the 127 characters are special characters, such as (!@#$%¢()_=−[]) and the like. The trading character set would be defined as 127 graphic symbols that would be used for display and data input. The user at terminal 12 could input them from a keyboard 47 like normal characters while holding down a special key. The current use of the shift key to get capitals would be an example. For example, oil may be shown as a barrel of oil or an oil derrick, corn may be shown as a corn cob, cattle may be shown as a steer, etc. As stated earlier, screen navigation and item selection are accomplished by a combination of touch screen, key pad entry, and voice entry. Prompting of the trader will be accomplished by voice and text display. Textual information will be received and printed on a high density matrix printer or a laser printer, depending upon the required speed and the daily volume.

When the international trader at the remote terminal 12 desires to communicate, he accesses the computer 44 (in FIG. 4) in any well-known manner as, for instance, through either the keyboard 20, touch screen 18, or voice entry 24 shown in FIG. 3 and has a trader access control screen displayed as shown in FIG. 5. This screen is the initial access screen that the trader uses. This screen is presented from the local exchange 10 of which the trader is a member or directly from the central information exchange 14 via satellite 16. Physical access security can be restricted by a variety of means. The least exotic is key access to the power switch. The more exotic is retinal and/or finger print verification. The patterns of finger prints or retinal patterns can be stored in the trader's terminal and verified periodically or at each major transaction input. With the screen shown in FIG. 5, the remote user enters the first and last name and access code number. This may be done through keyboard 20 or by voice entry 24 (in FIG. 3). If there is any difficulty, there may, for example, be a phone number 55 at the bottom of the screen to give instructions on how to correct the problem.

If the name and access code is correct, the system produces the commodity selection screen shown in FIG. 6. Obviously this may be simply the first page of a number of pages of display screens illustrating the various commodities that can be traded. The user will select any of the particular commodities in which he is interested by touching the appropriate area 50 which may contain the internationally known symbol described previously (not shown) or entering the name in any other well-known manner and the selected commodity will be remembered by the computer 19 (in FIG. 3).

The commodity selected, as well as the order of selection, determines which commodities appear on which of the real-time displays. This screen represented in FIG. 6 is one of the setup screens that enables the trader to customize the display to his/her interest. If, for example, the user is interested in obtaining market information on gold, silver, wheat, and soybeans, he touches the appropriate areas 50, or orally recites the names of the commodities, or enters the names through the keyboard 20 in FIG. 3. The system accepts the selected information in the normal fashion, such as by use of the word ENTER either through the keyboard, orally, or by touch screen.

The user selects the previous screen or the next screen by touching shaded area 51 to generate the necessary control information.

In any event, the next screen produced is the commodity exchange information selection screen shown in FIG. 7. This set of screens is used by the trader to select the local exchanges 10 from which information on the selected commodities would be received. As the information arrives at the trader's terminal 12, the commodities and exchanges 10 that the trader has selected are filtered out and displayed, the others ignored. This ability to select the set of information to be displayed in real-time enables the trader to concentrate on the information that is important. The unmanageable total volume of information is transformed by the intelligent terminal 12 to a concise subset. The trader is able to alter his selection of exchanges 10 and commodities at will. The user may be interested in the particular commodity selected on the screen in FIG. 6 as it is traded on several different local exchanges. He may, for example, select Nymex, Comex, the Chicago Board of Trade, Chicago Mercantile, and Brussels exchanges. Again these may be selected by touch screen, voice entry, or keyboard entry from the screen in FIG. 7.

Also, as described previously with respect to FIG. 6, the user may select the previous screen or the next screen by touching areas or symbols 51 to generate the appropriate control signals or information.

Figure 8:
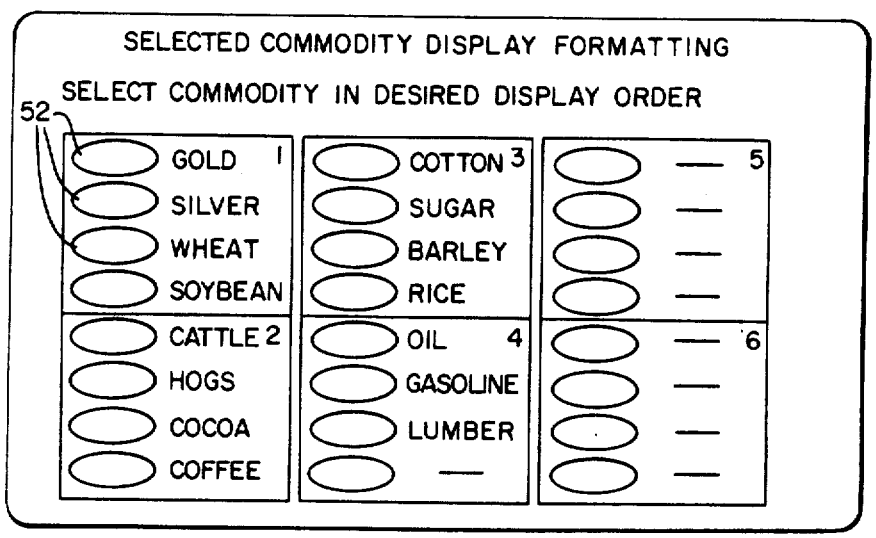
FIG. 8 is a diagrammatic representation of the selected commodity display format for prioritizing commodities which include touch screen data entry.

The screen in FIG. 8 is then displayed which is the selected commodity display formatting. The FIG. 8 screen is selected by the trader when he/she wants to change the order of the selected commodities. The numbered squares are the screen designations. Each square shows what will be displayed on the real-time commodity tracking screens. The trader can change the order and screen that a commodity is shown on by selecting and touching the shaded areas in the new order desired. The screen is then altered to reflect the new order as each change is made. There is the ability to cancel the changes requested in total. For instance, if the area or symbol representing oil in FIG. 8 is touched, it would appear on the area 52 where gold is shown and then all of the commodities beginning with gold would simply be shifted one space to the area below it, thus rearranging priority. The FIG. 8 screen is one of several necessary to enable the trader to make new display order selections. The four selected commodities shown in the boundary designated by the numeral 1 (gold, silver, wheat, and soybeans) may be selected by touching each associated area 52 in sequential order or using voice data entry in sequential order or entering the commodities sequentially through a keyboard or orally as described previously.

Figure 9:
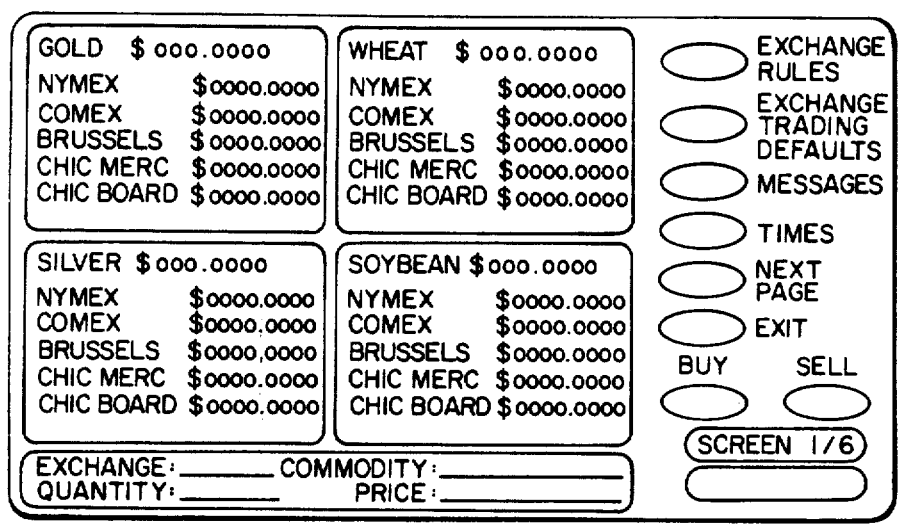
FIG. 9 is a diagrammatic representation of the commodities selected for display which includes partial touch screen data entry.

When that is accomplished, the display is then altered, as indicated in FIG. 9, wherein the highest bid and lowest offer gold prices for the various exchanges selected are shown, the corresponding wheat prices for the same exchanges are shown, the corresponding silver prices for the same exchanges are shown, and the corresponding soybean prices for the same exchanges are shown. FIG. 9 also includes touch areas shown shaded which will generate control signals which allow the trader to call up exchange rules, trading defaults, messages, existing times at each of the local exchanges, select the next page, exit, buy, or sell. The FIG. 9 screen illustrates one of the real-time displays of the selected commodities from the selected exchanges 10. The dollar amount across from the commodity name is the summary position of the commodity compiled from the selected exchange. The prices on this screen and the screens that follow it change in real-time. The touch function selections shown as shaded areas on the right hand of the screen generate appropriate control information or signals and provide the trader access to pertinent exchange information when touched. The "rules" selection accesses the on-line exchange rules for each exchange. The "exchange defaults" selection selects a screen where the trader enters the standard information that each exchange 10 would need for trading, such as user password and the like. The necessary trading information is entered at the bottom of the screen in FIG. 9 in the appropriate blanks and the BUY or SELL shaded area touched and the proposed transaction is entered. Confirmation that the proposed transaction has been delivered to the proper exchange is displayed in the blank area in the bottom right hand corner of the FIG. 9 screen.

If a message comes in from one of the exchanges for the trader, the "message" touch area is highlighted and the trader selects it to read the message and respond if necessary. The "times" touch selection shows a screen of clocks of the existing time at each of the exchanges and their open and close times. The "exit" and "next" touch areas perform the normal screen navigation functions.

Figure 10:
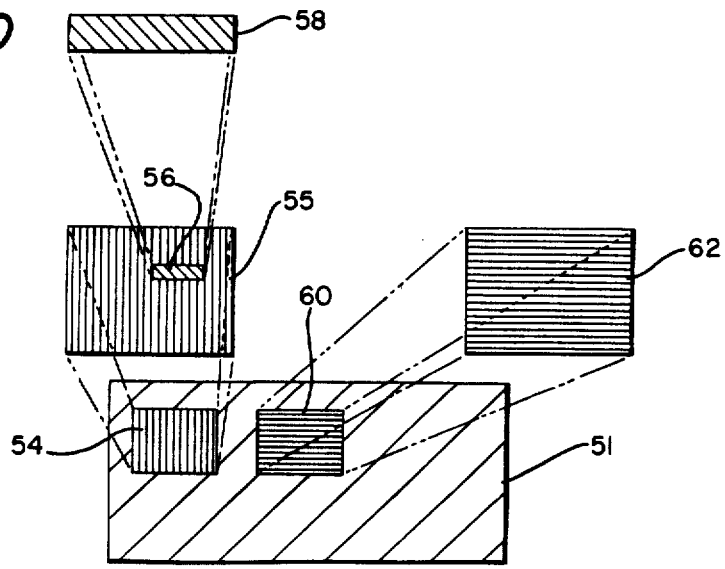
FIG. 10 is an illustration of how a portion of a screen may be expanded by touching a particular area of the screen.

The commodity boxes in FIG. 9 where the current prices are shown are also touch areas (see FIG. 10). When the commodity area is touch selected (for example, by touching a symbol such as the numeral 1), the commodity data expands to a whole screen as shown in FIG. 10 containing more information than price, such as volume, highs and lows, etc., for each exchange. From this expanded set of screens a touch selection of one of the areas would again expand to a full screen of information about that area's related activity, such as a particular commodity and the trader's current position in the selected commodity. Thus, if area 54 of screen 53 in FIG. 10 is touched, it expands to screen 55. If area 56 is touched, it further expands to screen 58, and if area 60 is touched, it expands to area 62. Navigation backwards through the expanded screens is by selection of the "exit" touch selection shown in FIG. 9. FIG. 10 thus illustrates the explosion of information from the commodity price display screen to the more detailed information display screens. If a trade is desired regarding any of these commodities, the operator or international trader merely enters on the screen in FIG. 9 the name of the exchange in which he is interested in the blank designated "exchange", the commodity in which he is interested in the blank designated "commodity", the quantity of the commodity in which he is interested in the blank designated "quantity", and the price that he willing to pay or at which he is willing to sell in the blank designated "price". The trades can then take place.

Each trader should consider his remote terminal as a natural extension of his normal working environment. To accomplish this, the interface to the trading system is versatile. Data entry is done as indicated through a normal keyboard, a numeric key pad, and/or voice. Screen transitions are accomplished by voice or touch screen entry. Errors and event notification are by symbols and voice output. All text and voice output will be translated to the trader's native language.

Thus, there has been disclosed a computerized world trade exchange which enables individual remote terminal users or traders to obtain information concerning, or to make, and receive bids and offers to, and from, any other trader associated with any other exchange around the world through their own local exchanges which communicate through a satellite system to a central exchange which records and handles all data transactions.

While the invention has been described in connection with a preferred embodiment, it is not intended to limit the scope of the invention to the particular form set forth, but, on the contrary, it is intended to cover such alternatives, modification, and equivalents as may be included within the spirit and scope of the invention as defined by the appended claims.

I claim:

1. An automated international commodity trade exchange comprising:
   a. a plurality of local computerized trade exchanges located in at least two different countries around the world, each local exchange performing computerized trades in markets such as the futures market, cash market, oil market, stock market, and the securities market;
   b. means in each local exchange for identifying said local exchange by a first code;
   c. a plurality of user computer terminals coupled to each of said local exchanges, each terminal transmitting and receiving trading data representing user bids and offers to, and from, its respective local exchange to enable said local exchange to perform computerized trades;
   d. means in each of said user terminals for generating a second code for identifying said user terminal;
   e. a central exchange host having a computer therein;
   f. a satellite communication system in orbit about the earth such that said satellite system can be directly accessed from any local exchange or said central exchange host at any time;
   g. computer means in said host for receiving and storing said trading data representing user bids and offers received from said local exchanges through said satellite communications system, and
   h. transmitting means in said central exchange host for forwarding said stored trading data in said host computer means representing said user bids and offers to each local exchange through said satellite communication system thereby enabling each of said user terminals in any one local exchange to communicate said trading data through its respective local exchange and said central exchange host to any other user terminal in any other local exchange to effect a trade.

2. An automated international commodity trade exchange as in claim 1 wherein said means for storing trading data in said host computer further comprises:

a. means in said central exchange host computer for receiving said trading data from said local exchanges through said satellite communication system, and
b. means for storing said received data according to identification by said first and second codes such that all said trading data representing said user bids and offers from any one user terminal may be transmitted from said central exchange host to any other of said user terminals through a respective local exchange to effect a trade.

3. An automated international commodity trade exchange as in claim 2 further including:
   a. a respective satellite transmitter and receiver included in said central exchange host and each of said respective local exchanges;
   b. means coupling each said local exchange to its respective satellite transmitter and coupling said central exchange host to its satellite receiver such that said trading data representing said bids and offers from any one of said local exchanges may be transmitted to, received by and stored in said central exchange host through said communications satellite;
   c. means coupling each said local exchange to its respective satellite receiver and coupling said central exchange host to its satellite transmitter such that said trading data representing said user bids and offers from any one local exchange may be transmitted by said central exchange host via said communications satellite to any other user terminal through its respective local exchange to enable said user bids and offers to be made by and between any of said user terminals through their respective local exchanges and said central exchange host via said communications satellite.

4. An automated international commodity trade exchange as in claim 3 further comprising:
   a. means in each respective local exchange for transmitting said trading data representing said user bids and offers to said central exchange host through said communications satellite in the language of said user whose terminal is transmitting said user bids and offers; and
   b. means in each respective local exchange for translating said trading data received from said central exchange host representing said user bids and offers into the language of the receiving exchange when said language of said receiving terminal user differs from that of the transmitting terminal user.

5. An automated international commodity trade exchange as in claim 4 wherein said translating means comprises:
   a. means in each local exchange for receiving trading data representing said user bids and offers from any other local exchange through said communications satellite and said central exchange host in the language of the user associated with said local exchange transmitting said data;
   b. means coupled to said receiving means in each local exchange for translating said trading data representing said user bids and offers from said transmitting user language to the language of said user associated with said receiving exchange when said language of said receiving exchange user differs from that of the transmitting terminal user; and
   c. means in each local exchange and in its corresponding user terminal coupled to said translating means for displaying said received bids and offers in said language of said receiving exchange user.

6. An automated international commodity trade exchange as in claim 5 further including:
   a. an encryption circuit in each local exchange for scrambling data representing user bids and offers being transmitted to said central exchange host to provide system security; and
   b. a decryption circuit in each local exchange for descrambling all data representing user bids and offers received from said central exchange host.

7. An automated international commodity trade exchange as in claim 6 further including:
   a. means in said central exchange host for compiling all trading data received from said local exchanges thereby representing current market information;
   b. an encryption circuit and a decryption circuit in said central exchange host for respectively scrambling and descrambling data transmitted and received;
   c. means in each user terminal for transmitting requests for said market information directly to said central exchange host via said communications satellite thereby bypassing said local exchanges;
   d. an encryption circuit in each user terminal coupled to said request transmitting means for scrambling said market information requests being transmitted; and
   e. a decryption circuit in each user terminal for descrambling market information directly received from said central exchange host thereby bypassing said local exchange.

8. An automated international commodity trade exchange as in claim 1 further including:
   a. a display screen at each of said user computer terminals;
   b. a touch screen data entry device associated with said display screen;
   c. first means coupled to said display screen touch screen data entry device for generating symbols representing at least a part of said trading data; and
   d. second means coupled to said touch screen data entry device for transmitting said at least part of said trading data selected to the local trade exchange to which each user terminal is coupled by touching predetermined ones of said symbols.

9. An automated internal commodity trade exchange as in claim 8 further including:
   a. third means coupled to said touch screen data entry device for expanding a selected portion of a displayed screen to a full screen size; and
   b. fourth means coupled to said touch screen data entry device for supplying additional data to said expanded screen pertinent to the original data thereon.

10. An automated international commodity trade exchange as in claim 9 wherein said symbols represent commodities and local exchanges which the user can select in transmitting said trading data representing bids and offers.

11. An automated international commodity trade exchange as in claim 10 wherein said symbol generating means further includes:
    a. means for generating symbols representing control signals for use by the operator in manipulating said screens presented on said display; and b. means coupled to said symbol generating means for manipulating said screen according to the symbol touched by said operator.

12. A method of trading in an international commodity trade exchange comprising the steps of:
   a. establishing a plurality of local computerized trade exchanges, each of said local exchanges performing computerized trades in markets such as the futures market, cash market, oil market, stock market, and the securities market;
   b. locating each of said local exchanges at a predetermined one of a like plurality of locations in at least two different countries around the world;
   c. establishing the identity of each local exchange by a first code;
   d. coupling a plurality of user terminals to each local exchange, each of said user terminals transmitting, and receiving, trading data representing user bids and offers to, and from, its respective local exchange to enable said local exchange to perform computerized trades;
   e. establishing the identity of each of said user terminals by a second code;
   f. establishing a central exchange host having a computer therein;
   g. utilizing a communications satellite system in orbit about the earth such that said satellite system can be accessed from any said local exchange or central exchange host on earth at any time;
   h. coupling each of said local exchanges in said at least two different countries to said central exchange host through said communications satellite system;
   i. receiving and storing said trading data representing user bids and offers from said local exchanges in said computer means in said cental exchange host; and
   j. transmitting said stored trading data in said host representing said user bids and offers to each local exchange through said satellite communications system so as to enable each of said user terminals in any one local exchange to communicate said trading data through a respective local exchange and said central exchange host to any other user terminal in any other local exchange to effect a trade.

13. A method as in claim 12 further including the steps of:
   a. receiving in said central exchange host computer said trading data transmitted from said local exchanges through said satellite communications system, and
   b. storing said received data according to identification by said first and second codes such that all said trading data representing said user bids and offers from any one user terminal may be transmitted from said central exchange host to any other of said user terminals through a respective local exchange to effect a trade.

14. A method as in claim 13 further including the steps of:
   a. coupling a respective satellite transmitter and receiver to said central exchange host and to each of said respective local exchanges;
   b. transmitting said trading data representing said user bids and offers from each of said local exchanges to said central exchange host for storage through said communications satellite; and
   c. transmitting any of said trading data representing said user bids and offers stored in said central exchange host to any local exchange through said communications satellite such that any of said stored trading data representing said user bids and offers is available to any one of said user terminals through its respective local exchange to enable user bids and offers to made by and between any of said user terminals through their respective local exchanges and said central exchange host via said communications satellite.

15. A method as in claim 14 further including the steps of:
   a. transmitting said trading data representing said user bids and offers from a respective one of said local exchanges to said central exchange host through said communications satellite in the language of said user whose terminal is transmitting said user bids and offers;
   b. translating said data representing said bids and offers received from said central exchange host by a respective one said local exchanges into the language of the receiving exchange when said language of said receiving terminal user differs from that of the transmitting terminal user; and
   c. displaying at said receiving user terminals said translated bids and offers in said language of said receiving terminal user.

16. In an automated international commodity trade exchange having a plurality of local computerized trade exchanges located at various sites around the in different countries, a plurality of user computer terminals coupled to each local trade exchange and each having means for generating trading data representing bids and offers, a central exchange host having a computer therein, and a communication system coupled to said local trade exchange and said central exchange host whereby trading data may be coupled from any one user terminal to any other user terminal thereby effecting a trade, an improved means for generating said trading data representing said bids and offers comprising:
   a. a display screen at each of said user computer terminals;
   b. means for displaying on said display screen a first screen for commodity selection which lists a plurality of symbols representing a like plurality of commodities available for trading whereby commodities may be selected for trading by touching desired ones of said symbols;
   c. means for displaying on said display screen a second screen for commodity exchange selection which lists a plurality of symbols representing a like plurality of local commodity exchanges as members of said trade exchange and from which trading is available whereby at least one of said exchanges may be selected for trading by touching at least one of said symbols representing the selected exchange;
   d. means for displaying on said display screen a third screen for selectng commodity display formatting which lists a plurality of symbols representing the selected commodities by groups whereby said commodities may be prioritized by touching said commodity symbols in any desired order; and
   e. means for selecting any one of said prioritized commodity groups for full screen display.

17. An automated international commodity trade exchange as in claim 16 wherein said selected full screen display commodity group includes:
   a. information regarding each selected commodity in said selected display group, including the selected exchanges and the highest bid and lowest offer prices for each selected commodity on each selected exchange; and
   b. a group of blanks with a term associated with each blank giving instructions for information necessary in that blank to initiate a trade of any of the displayed commodities.

18. An automated international commodity trade exchange as in claim 17 further including on said full screen display:
   a. a group of symbols representing operations associated with trading whereby when any one of said group of symbols is touched, the selected information is displayed; and
   b. a symbol associated with each one of said commodity groups on said full screen display whereby when one of said symbols associated with a particular commodity group is touched that commodity group expands to a full screen display with greater financial data specific to those commodities.

19. An automated international commodity trade exchange as in claim 18 further including a symbol associated with at least one particular area of said expanded screen whereby when said particular area symbol is touched, the particular area expands to a full screen size with additional data specific to said expanded particular area.

20. In a method of automating an international commodity trade exchange having a plurality of local computerized trade exchanges located at various sites around the world, a plurality of user computer terminals coupled to each local trade exchange and each having means for generating trading data representing bids and offers, a central exchange host having a computer therein, and a communication system coupled to said local trade exchange and said central exchange host whereby trading data may be coupled from any one user terminal to any other user terminal thereby effecting a trade, an improved method for generating said trading data representing said bids and offers comprising the steps of:
   a. providing a display screen at each of said user computer terminals;
   b. displaying on said display screen a first screen for commodity selection which lists a plurality of symbols representing a like plurality of commodities available for trading whereby commodities may be selected for trading by touching desired ones of said symbols;
   c. displaying on said display screen a second screen for commodity exchange selection which lists a plurality of symbols representing a like plurality of local commodity exchanges as members of said trade exchange and from which trading is available whereby at least one of said exchanges may be selected for trading by touching at least one of said symbols representing the selected exchange;
   d. displaying on said display screen a third screen for selecting commodity display formatting which lists a plurality of symbols representing the selected commodities by groups whereby said commodities may be prioritized by touching said commodity symbols in any desired order; and
   e. selecting any one of said prioritized commodity groups for full screen display.

21. A method of automating an international commodity trade exchange as in claim 20 wherein said step of selecting full screen display commodity group further includes the steps of:
   a. displaying information regarding each selected commodity in said selected display group including the selected exchanges and the highest bid and lowest offer prices for each selected commodity on each selected exchange; and
   b. displaying a group of blanks with a term associated with each blank giving instructions for information necessary in that blank to initiate a trade of any of the displayed commodities.

22. A method of automating an international commodity trade exchange as in claim 21 further including the steps of:
   a. displaying on said full screen display a group of symbols representing operations associated with trade whereby when any one of said group of symbols is touched, the selected information is displayed; and
   b. associating a symbol with each one of said commodity groups on said full screen display whereby when one of said symbols associated with a particular commodity group is touched that commodity group expands to a full screen display with greater financial data specific to those commodities.

23. A method of automating an international commodity trade exchange as in claim 22 further including the step of associating a symbol with one particular area of said expanded screen whereby when said particular area symbol is touched, the particular area expands to a full screen size with additional data specific to said expanded particular area.

* * * * *